Patented May 23, 1939

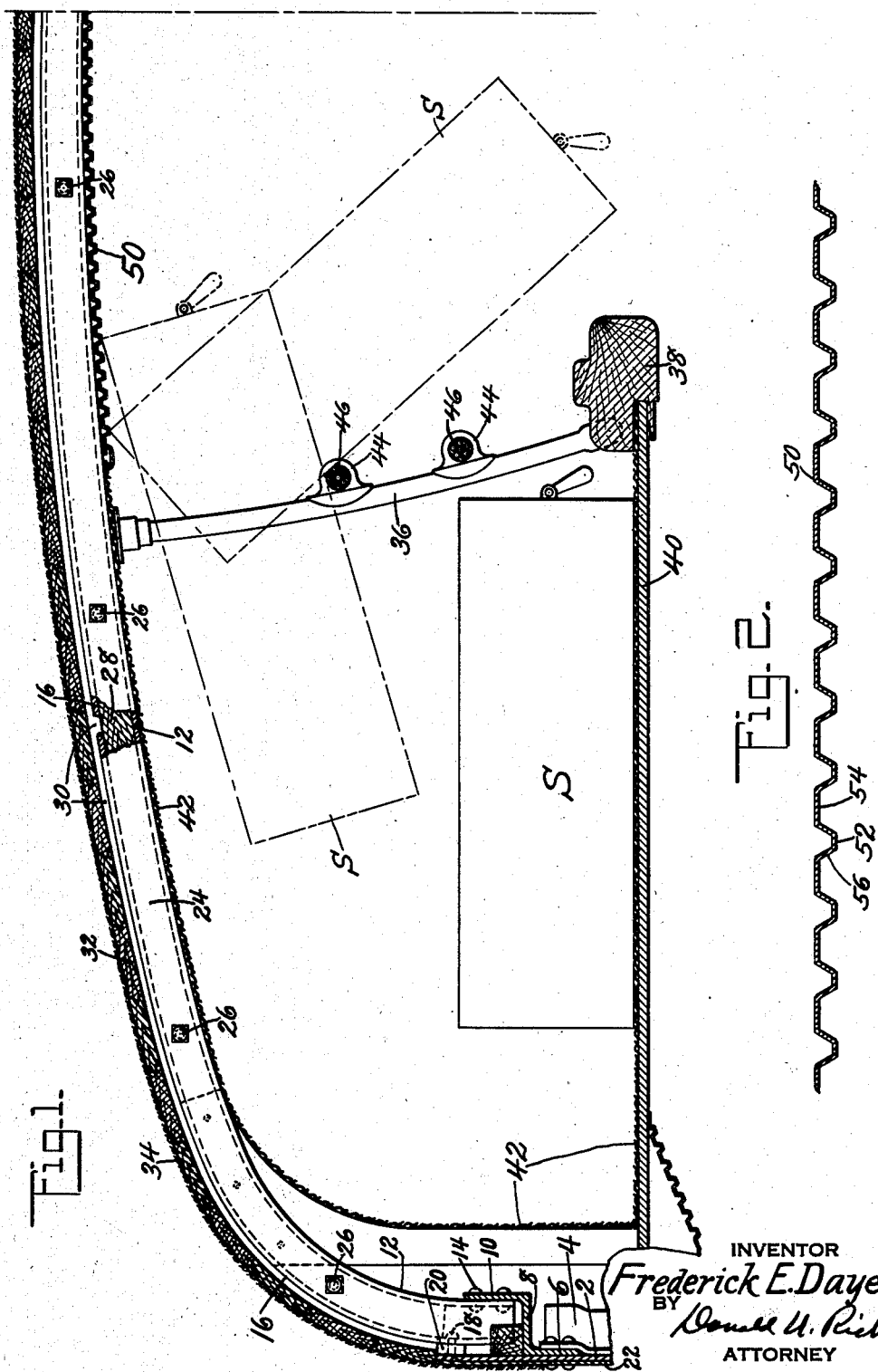

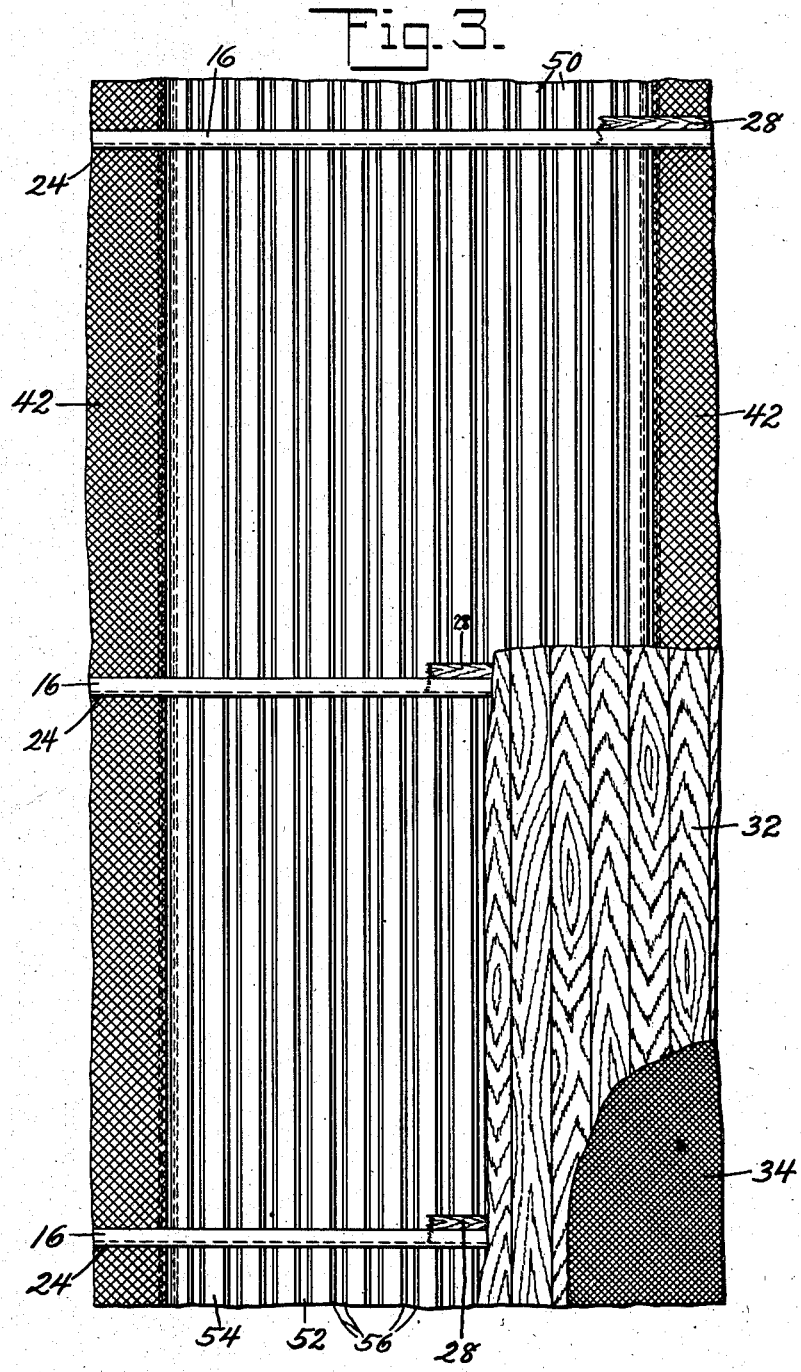

2,159,783

UNITED STATES PATENT OFFICE 2,159,783

VEHICLE ROOF CONSTRUCTION

Frederick E. Dayes, Philadelphia, Pa., assignor to American Car and Foundry Motors Company, New York, N. Y., a corporation of Delaware Application February 16, 1937, Serial No. 125,974

2 Claims. (Cl. 296—137)

This invention relates broadly to motor vehicle constructions and particularly to the overhead or roof construction for passenger vehicles.

In passenger vehicles as previously constructed the ceiling portion has been finished either with painted metal plates or with some type of upholstery but in any case the ceiling was marred or injured in some manner by the baggage which is normally carried in a rack adjacent the ceiling. These vehicles also did not have sufficient longitudinal stiffness to strengthen the roof in case of collision or other accident. It is an object, therefore, of the invention to provide a roof structure in passenger vehicles in which a relatively strong longitudinally extending member is secured to the roof structure.

Another object of the invention is the provision of a combined ceiling plate and longitudinal strength member.

A further object of the invention is the provision of a corrugated ceiling plate which may be decorated in such a manner as to improve the interior appearance of the vehicle, while at the same time preventing injury thereto by articles being inserted or withdrawn from the baggage racks.

These and other objects of the invention will be apparent to persons skilled in the art from a study of the following description and accompanying drawings, in which:

Figure 1 is a sectional view showing one-half of the roof structure;

Fig. 2 is an enlarged view showing the preferred type of corrugated ceiling plate, and Fig. 3 is a plan view of the roof structure shown in Figure 1, portions thereof being broken away to better illustrate the construction.

Referring now to the drawings in detail and particularly to Figure 1 which is a symmetrical or half view of a portion of the vehicle, it is seen that the vehicle is constructed with usual side walls 2 braced by posts 4 which are offset slightly at their upper portion to receive the downwardly extending flange 6 of the side plate. The side plate in the instance shown is of Z-bar formation having the web 8 thereof extended inwardly from the side wall, while the vertical flange 10 extends upwardly in spaced relation to the portion of the side wall extended above the side plate, thus forming a pocket for the reception of the lower ends of the carlines. The carlines are preferably of channel formation bent to conform with the desired roof contour and having one flange 12 thereof riveted or otherwise secured as at 14 to the side plate flange 10, while the other flange 16 is secured to the wall extension by means of rivet 18 extending through the wall extension and a metal filler washer 20. The usual letterboard 22 is secured to the wall plate at the upper portion as clearly shown in Figure 1.

The web 24 of the carlines is preferably drilled to receive bolts 26 by means of which wood filler member 28 may be secured in position. This filler member is cut so that one portion thereof will enter between the flanges of the channel carline, while another portion 30 will extend slightly above the carline flange in order to support the roof boards 32 in spaced relation to the carline. The roof boards are secured to the filler boards by means of nails or screws and are preferably treated with some preservative compound. In order to complete the roof structure a waterproof material 34 is secured to the roof boards preferably by some type of cement, thus forming a roof of pleasing appearance impervious to moisture.

The customary baggage rack is secured to the roof and side structure and consists of spaced hanger members 36 secured at their upper ends to alternate carlines and at their lower ends to rail 38 supporting the inner end of plate 40, while the outer end is supported by brackets, not shown, fastened to the wall structure. This baggage rack or compartment is preferably floored and covered by means of carpeting or other light decorative material 42. The hanger members are provided with the usual loops 44 forming supports for elastic retaining bars 46.

The roof structure as just described is of general conventional form and it is seen that such a structure has practically no strength in a longitudinal direction, since the carlines are not braced in any manner between the side plates and since the roofing boards are merely secured to the carlines through a filler or nailing strip bolted to the carlines. Such a structure also has very little strength to resist any torsional or twisting strains to which the roof might be subjected.

In order to provide the roof with ample longitudinal stiffness yet without using purlines, a corrugated metal ceiling plate 50 is rigidly secured to the lower surface of the carline flange 12 in some manner, such as by spot welding. This ceiling plate is corrugated in such a manner that the corrugations run longitudinally of the vehicle and the plate preferably extends in one piece from end to end of the vehicle. The ceiling plate is preferably made of some material, such as stainless steel, and is deformed or pressed to provide crests 52 and valleys 54 joined by sloped portions 56. The valley portions may be spot welded or otherwise secured to the carline, after which the valley and sloped portions are preferably painted, thus forming a ceiling plate of alternate painted and polished surfaces extending the full length of the vehicle. The polished or bare metallic surfaces 52 being spaced outwardly from the painted surfaces will receive all impact from baggage or other articles being inserted or removed from the racks and prevent the marring of the painted surfaces as clearly indicated in Figure 1 in which a suitcase S has been illustrated in various positions of insertion and removal from the rack.

It is thus seen that a decorative ceiling plate has been provided which cannot be readily marred or injured by objects and that this plate, since it is rigidly secured to the carlines and covers substantially the entire central portion thereof, will resist any weaving tendency of the roof structure and also since the corrugations extend longitudinally they act as tubes giving the structure great longitudinal strength. This plate also serves as a very strong tension member between carlines, resisting any crushing action that might be imposed by overturning of the vehicle.

While the construction has been described more or less in detail, it is obvious that various modifications and rearrangements may be accomplished and all such modifications and rearrangements are contemplated as fall within the scope of the following claims.

What is claimed is:

1. In a roofed vehicle the combination of spaced side walls, a side plate secured to each side wall adjacent the upper edge thereof, a plurality of carlines connected at their ends to the side plates, roofing above the carlines and connected thereto to form a roof structure, a baggage rack carried in part by the roof structure adjacent each side portion thereof, and a corrugated metal plate having its corrugations extending longitudinally of the vehicles and secured to the under side of the carlines between the baggage racks, the valleys of said plate being painted, while the crests thereof remain unpainted thereby presenting an unpainted metallic surface against which baggage may contact during insertion or removal from the racks without injuring the painted surfaces.

2. A ceiling for a vehicle comprising a corrugated plate, the corrugations extending longitudinally substantially from end to end of the vehicle and having the walls forming the depressed portions of the corrugations coated and the exposed crests uncoated and providing protective wear surfaces for the coated depressed wall portions.

FREDERICK E. DAYES.